United States Patent [19]

Girardi

[11] 4,334,305
[45] Jun. 8, 1982

[54] DATA-HANDLING SYSTEM WITH OPERATIVELY INTERCONNECTED PROCESSORS

[75] Inventor: Gerardo Girardi, Turin, Italy

[73] Assignee: CSELT - Centro Studi e Laboratori Telecomunicazioni S.p.A., Turin, Italy

[21] Appl. No.: 121,445

[22] Filed: Feb. 14, 1980

[30] Foreign Application Priority Data

Feb. 15, 1979 [IT] Italy .............................. 67323 A/79

[51] Int. Cl.³ .............................................. H04J 3/08
[52] U.S. Cl. ...................................... 370/86; 364/200
[58] Field of Search ........................... 370/86, 89, 92; 364/200

[56] References Cited

U.S. PATENT DOCUMENTS

| 3,755,789 | 8/1973 | Collins | 364/200 |
| 3,787,627 | 1/1974 | Abramson et al. | 370/92 |
| 3,790,717 | 2/1974 | Abramson et al. | 370/89 |
| 4,002,842 | 1/1977 | Meyr et al. | 370/86 |
| 4,042,783 | 8/1977 | Gindi | 370/86 |
| 4,071,824 | 1/1978 | Warren | 370/86 |

FOREIGN PATENT DOCUMENTS 9824 10/1979 European Pat. Off. .
2315725 1/1977 France .

OTHER PUBLICATIONS

IEEE Proceedings of the Annual Symposium of Computer Architecture, vol. 3, pp. 124-129, Jan. 19-21, 1976.

Primary Examiner—Douglas W. Olms
Attorney, Agent, or Firm—Karl F. Ross

[57] ABSTRACT

A number of data processors have access, via respective interfaces, to a common ring memory made up of cascaded shift-register sections. Each interface comprises a pair of shift registers or a pair of read/write memories one of which, at a given instant, is operatively connected to the ring memory while the other coacts with the processor, their roles being interchanged from time to time by a switchover signal from a logic network in response to an instruction from the associated processor. The logic networks of all interfaces receive clock pulses from a common time base and, optionally, may be able to inhibit temporarily the emission of such pulses pending completion of an exchange of information with the ring memory.

6 Claims, 3 Drawing Figures

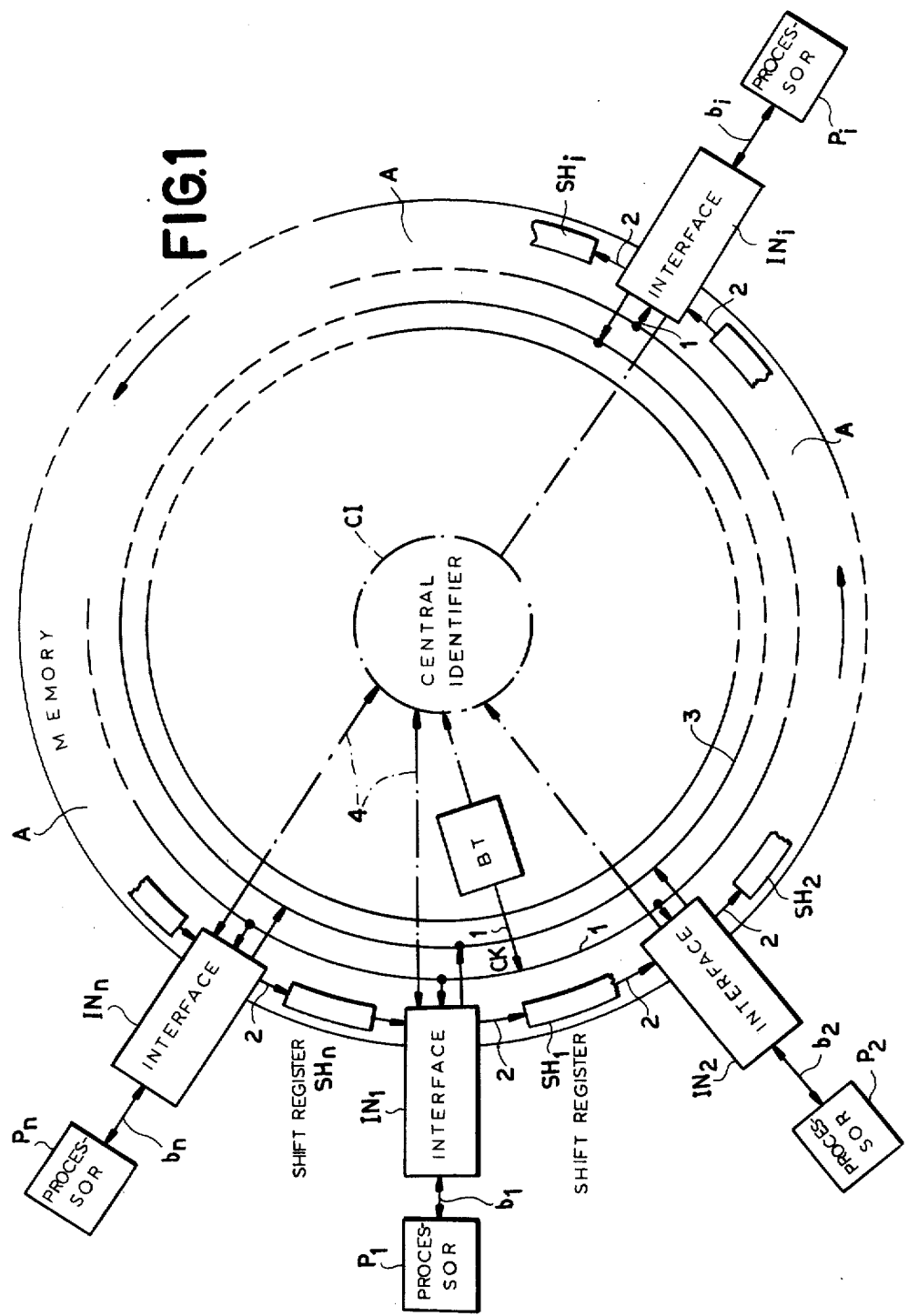

DATA-HANDLING SYSTEM WITH OPERATIVELY INTERCONNECTED PROCESSORS

FIELD OF THE INVENTION

My present invention relates to a data-handling system in which a multiplicity of processors can be operatively interconnected to exchange messages among one another.

BACKGROUND OF THE INVENTION

In data-handling systems it is frequently necessary to utilize a number of independently operating processors complementing one another in the performance of a common task, e.g. the establishment of a telecommunication link.

Conventional equipment facilitating the exchange of messages in a multiprocessor system allows the interconnection of only two data processors at a time, the equipment being thus inaccessible to other processors during that period. Such equipment may be a bus or a memory associated with an arbitration device serving to determine the order in which requests for acess from different processors can be satisfied.

The temporary denial of access to other processors results in the formation of waiting queues which adversely affect the operating speed of the system. Controlling these queues and programming the arbitration device requires relatively complex additional circuitry. Moreover, the operating capacity of such a device limits the number of processors to be included in the system.

OBJECTS OF THE INVENTION

The general object of my present invention, therefore, is to provide improved means for facilitating the exchange of information among any number of processors with elimination of the need for an arbitration device, minimization of waiting periods and ready adjustability to a different number of participating data processors.

A more particular object is to provide means in such a multiprocessor system for the preservation of messages which cannot be handled immediately upon becoming available.

SUMMARY OF THE INVENTION

I realize these objects, in accordance with the present invention, by the provision of a ring memory with a multiplicity of access points which are respectively assigned to the several participating processors, each processor being connected to an associated interface which is inserted at the assigned access point in the ring memory for enabling the exchange of data therebetween. Each interface comprises storage means alternately connectable to the ring memory and to the respective processor; a source of clock pulses common to all the interfaces times the circulation of data through the ring memory by way of a signal path established at each interface.

Advantageously, pursuant to a more particular feature of my invention, the storage means of one or more of these interfaces comprises a pair of data stores, such as shift registers or read/write memories, together with circuit means for temporarily establishing simultaneous operative connections between one data store of the pair and the ring memory (i.e. in series with two adjoining shift registers forming part of that memory) and between the other data store and the respective processor, these operative connections being interchangeable by switchover means responsive to an instruction from the associated processor. Thus, one or the other data store is always included in the signal path of the ring memory while its mate coacts via a two-way connection with the processor as an ancillary data-handling component.

BRIEF DESCRIPTION OF THE DRAWING

The above and other features of the present invention will now be described in detail with reference to the accompanying drawing in which:

FIG. 1 is a block diagram showing the overall layout of a data-handling system embodying the invention;

SPECIFIC DESCRIPTION

In FIG. 1 I have schematically represented a data-handling system including a multiplicity of processors $P_1, P_2, \ldots P_i, \ldots P_n$. A ring memory A common to all these processors comprises an annular cascade of shift-register sections $SH_1, SH_2, \ldots SH_i, \ldots SH_n$, each of which may have any number of stages, between which there are interposed a multiplicity of interface units $IN_1, IN_2, \ldots IN_i, \ldots IN_n$ dialoguing with the respective processors via two-way multiples $b_1, b_2, \ldots b_i, \ldots b_n$. A time base BT emits clock pulses CK over a conductor 1 to all the interfaces $IN_1$ etc. and to stepping inputs of the various memory sections $SH_1$ etc. Other multiples 2 form part of a signal path for multibit code words or bytes passing from one memory section to the next through the intervening interface unit.

A further lead 3 extends from all the interfaces to time base BT for enabling any interface to request a temporary halt in the emission of clock pulses pending completion of a switching operation as described hereinafter.

Figure 2:
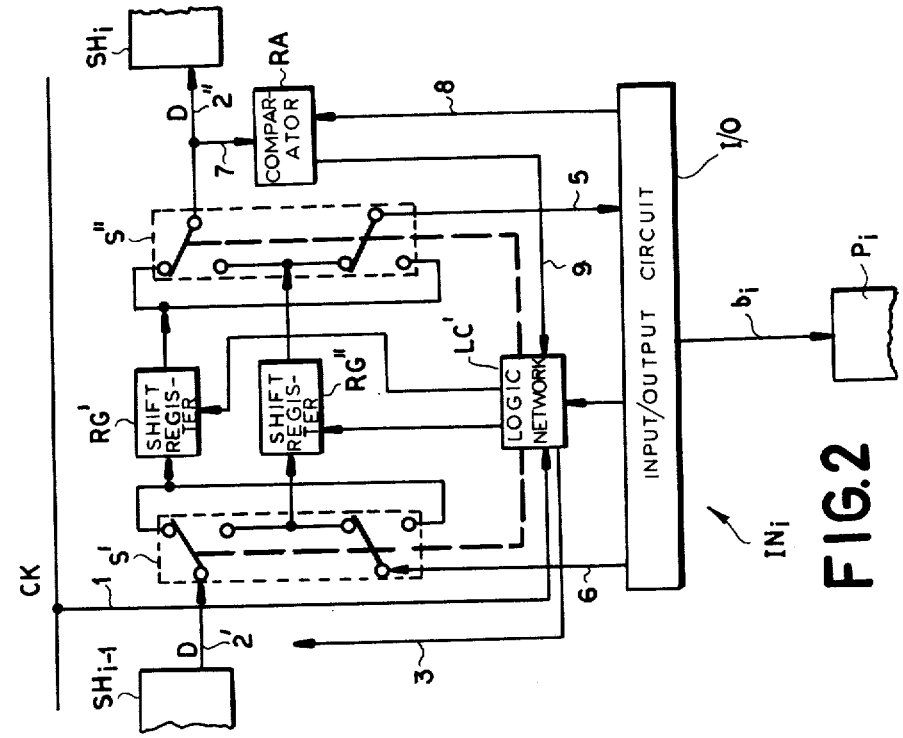
FIG. 2 is a more detailed view of an interface forming part of the system of FIG. 1.

In FIG. 2 I have illustrated a unit $IN_i$ representative of any of the interfaces shown in FIG. 1. This unit comprises a pair of shift registers RG' and RG" which are alternately insertable, by means of two multiplexers S' and S", between an input multiple 2' extending from an upstream memory section $SH_{i-1}$ and an output multiple 2" leading to a downstream memory section $SH_i$. In the illustrated multiplexer position, register RG' lies in series between these multiples to form a signal path for the data words D passing through interface $IN_i$. In the same multiplexer position, shift register RG" is connected between conductor groups 5 and 6 which are connected to the associated processor $P_i$ via multiple $b_i$ and input/output circuitry I/O comprising a nonillustrated set of logic gates controlled by the processor. Circuit I/O also transmits instructions from the processor to a logic network LC' which receives the clock pulses CK from lead 1 and controls the stepping of shift registers RG' and RG". More particularly, the register (here RG') lying in the throughgoing signal path is stepped by the clock pulses CK whereas the other register (here RG"), operatively connected to the processor, is read out and reloaded in the rhythm of the internal clock of the processor itself.

The two registers RG' and RG" need not have identical storage capacity, i.e. the same number of stages, though this is generally preferable. In a limiting case, one of these registers may be entirely replaced by a short circuit so that circulating data could be stored for subsequent transfer to the processor only after the latter has released the single shift register.

In the system being described it is assumed that each oncoming data word D is preceded by a characteristic bit combination or label indicating its nature. This label, upon appearing at the upper output of multiplexer S" connected to outgoing multiple 2", is fed to an input 7 of a comparator RA whose other input 8 receives from processor P$_i$ (via input/output circuit I/O) an instruction calling for a switchover whenever a data word of specified nature is loaded into register RG'. Comparator RA, upon detecting a match between an arriving label and an instruction emitted by the processor, actuates the logic network LC' via a connection 9 to reverse the two multiplexers S' and S" whereupon register RG" is inserted into the throughgoing signal path while register RG' is coupled to the processor. Thus, the data word last stored in register RG' is fed via multiple 5 to the processor which may then reload that register via multiple 6 with an outgoing data word to be introduced, after the next switchover, into the data stream circulating in ring memory A.

If the desired switchover cannot be performed in less than one clock cycle, logic network LC' emits on lead 3 an inhibition signal causing time base BT (FIG. 1) to suspend the generation of clock pulses CK until that signal disappears. Though this slows the circulation of data through the ring memory A and thus retards the overall operation, the possibility of temporarily arresting the time base simplifies the design of the interface by eliminating the need for high-speed switching equipment. The several leads 3 may be connected to the time base via an OR gate emitting a disabling signal whenever one or more of these leads are energized.

Figure 3:
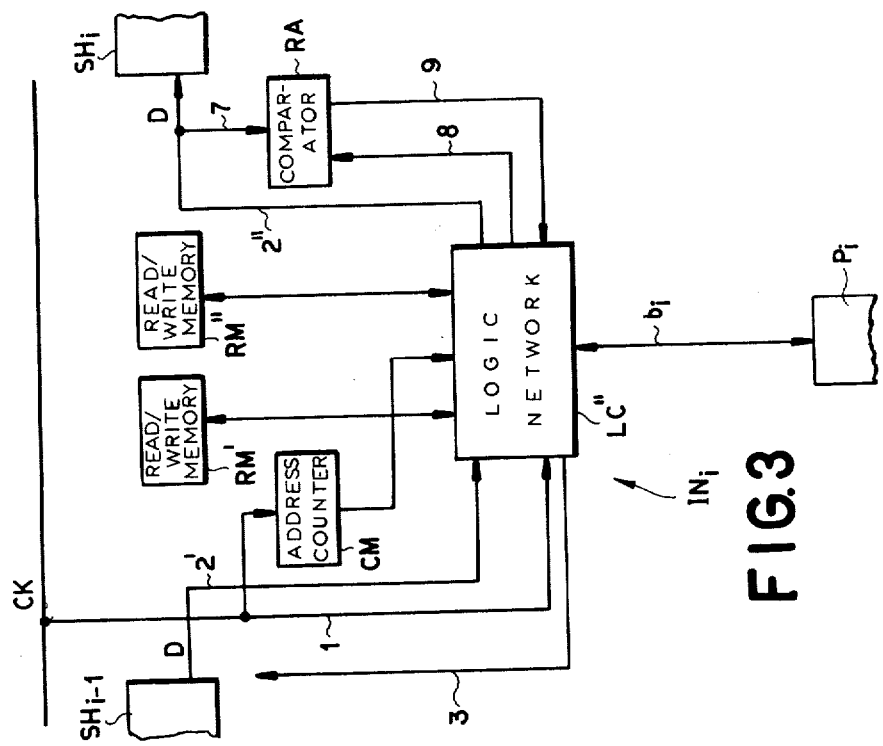
FIG. 3 is a diagram similar to FIG. 2, illustrating a modified interface.

In FIG. 3 we have shown a modified unit IN$_i$ in which the data stores are in the form of two read/write memories RM', RM" controlled by a logic network LC" which combines the functions of network LC', input/output circuit I/O and multiplexers S', S" of FIG. 2. An address counter CM receives the clock pulses CK from lead 1 and sequentially identifies the several cells of memories RM' and RM" to be subjected to a reading or writing operation in response to instructions from processor P$_i$ under the control of logic network LC". A comparator RA has the same function as in FIG. 2.

Here, again, the two data stores RM' and RM" are alternately connectable to the memory A and to the processor P$_i$. Data words arriving over input multiple 2' are loaded into, say, memory RM' and subsequently read out therefrom at the cadence of clock pulses CK whereas the reading and writing in the other memory (RM") is carried out in the rhythm of the local clock included in processor P$_i$. The use of read/write memories in lieu of the shift registers of FIG. 2 affords greater flexibility in the design of the associated logic network, yet the overall operation of unit IN$_i$ is the same in both instances.

Instead of providing each code word with its own label to be detected by a comparator RA, I may use a central identifier CI communicating via connections 4 with all the interfaces as illustrated in dot-dash lines in FIG. 1. This identifier will then monitor the progress of each data word or message through the ring memory and will supply information on the nature thereof, obtained from the originating processor, to all other processors through the associated interfaces so that each processor can determine whether an oncoming bit group is to be retrieved or allowed to pass straight through.

In either case, a message introduced into the ring memory A by one of the processors will be continuously recirculated until another processor is ready to pick it up for evaluation and possible retransmission in modified form.

It may be mentioned that the processors may be located at different distances from the ring memory A without any modification other than a change in the lengths of corresponding multiples b$_1$-b$_n$.

I claim:

1. In a data-handling system, in combination:
   a multiplicity of data processors operating independently of one another;
   a ring memory including a multiplicity of cyclically interconnected shift registers;
   a multiplicity of interfaces each connected to a respective processor and interposed between adjoining shift registers of said ring memory for enabling the exchange of data between the ring memory and the respective processor, each of said interfaces including a pair of data stores, circuit means for temporarily inserting one of said data stores in a series connection between said adjoining shift registers while simultaneously establishing a two-way connection between the other of said data stores and the respective processor, and switchover means for interchanging said connections in response to an instruction from the respective processor; and
   a source of clock pulses common to all said interfaces for timing the circulation of data through said ring memory by way of a signal path including the series-connected data store of each of said interfaces.

2. The combination defined in claim 1 wherein each of said interfaces further comprises comparison means connected to the respective processor and to said signal path for actuating said switchover means only upon detecting on said signal path an identification code matching said instruction.

3. The combination defined in claim 1, further comprising a signal generator common to all said interfaces for informing same of the nature of oncoming data as a criterion for actuation of said switchover means in response to said instruction.

4. The combination defined in claim 1, 3 or 4 wherein said interfaces are provided with individual connections to said source for temporarily inhibiting the emission of said clock pulses during actuation of said switchover means.

5. The combination defined in claim 1, 3 or 4 wherein said data stores are a pair of additional shift registers.

6. The combination defined in claim 1, 3 or 4 wherein said data stores are a pair of read/write memories, each of said interfaces further comprising counting means stepped by said clock pulses for sequentially addressing respective cells of said read/write memories.

* * * * *